April 12, 1938. R. B. JOHNSON 2,113,620
EXAMINATION PAPER GRADING DEVICE (ELECTRICAL)
Filed Oct. 9, 1933 6 Sheets-Sheet 3
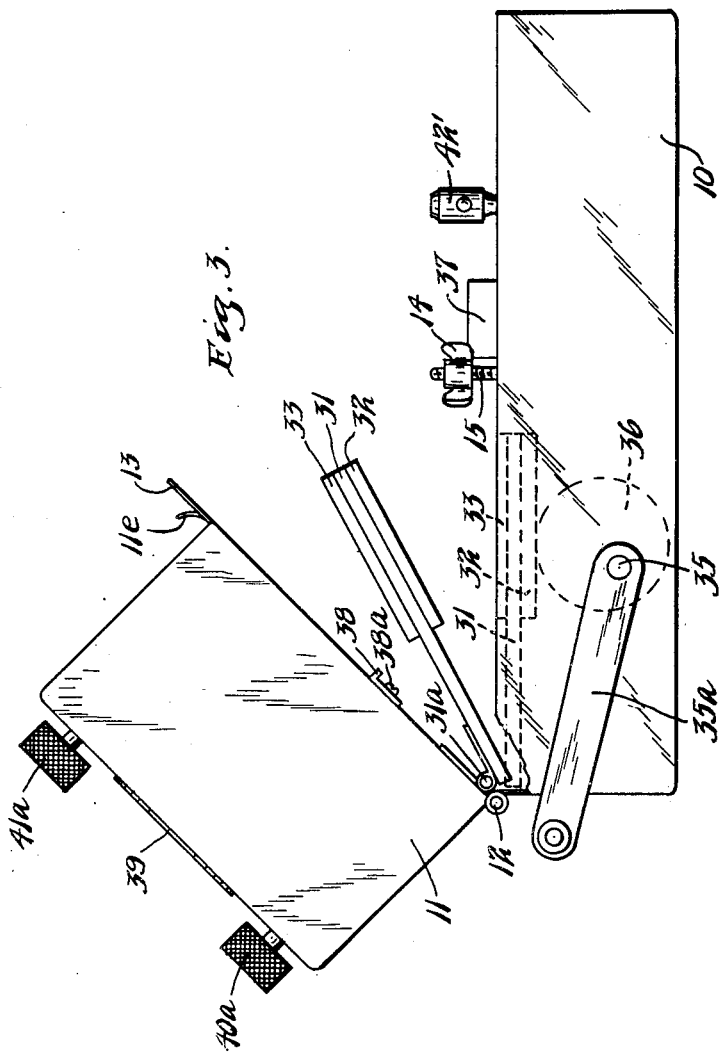
INVENTOR.
REYNOLD B. JOHNSON.
BY HIS ATTORNEYS.
Williamson & Williamson

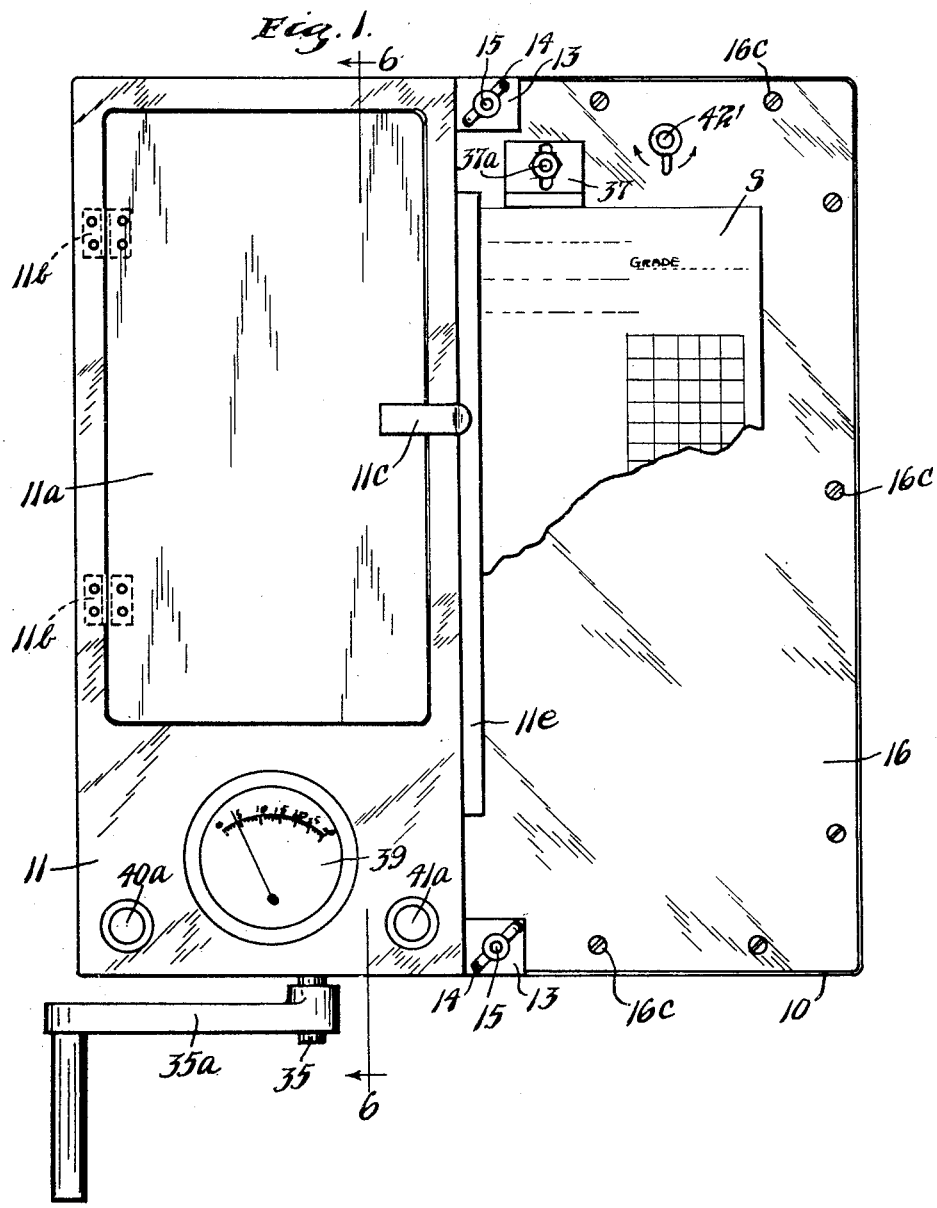

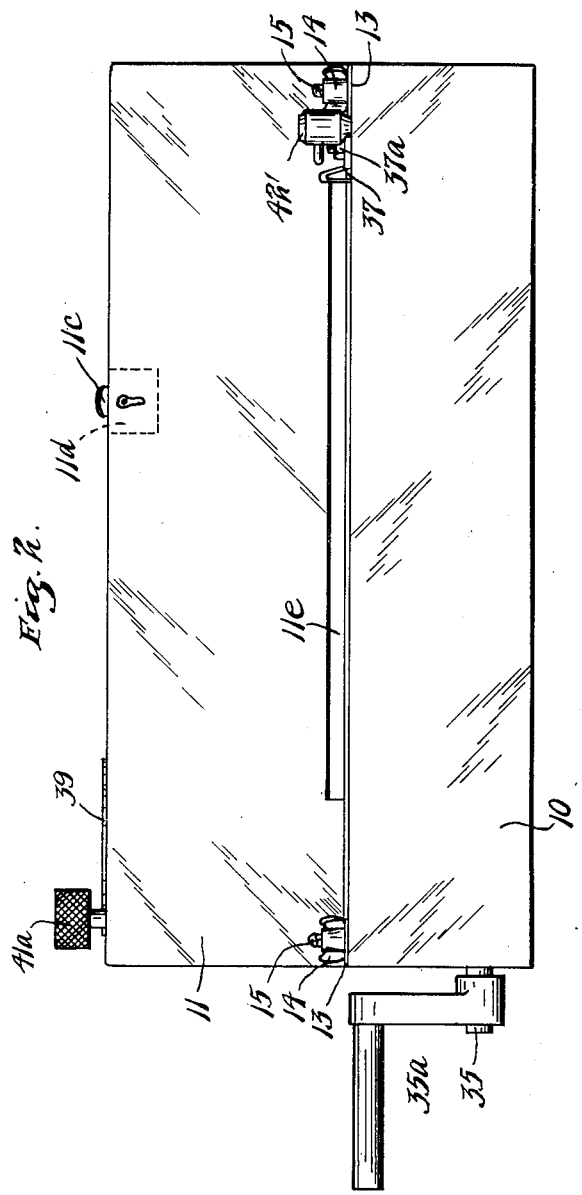

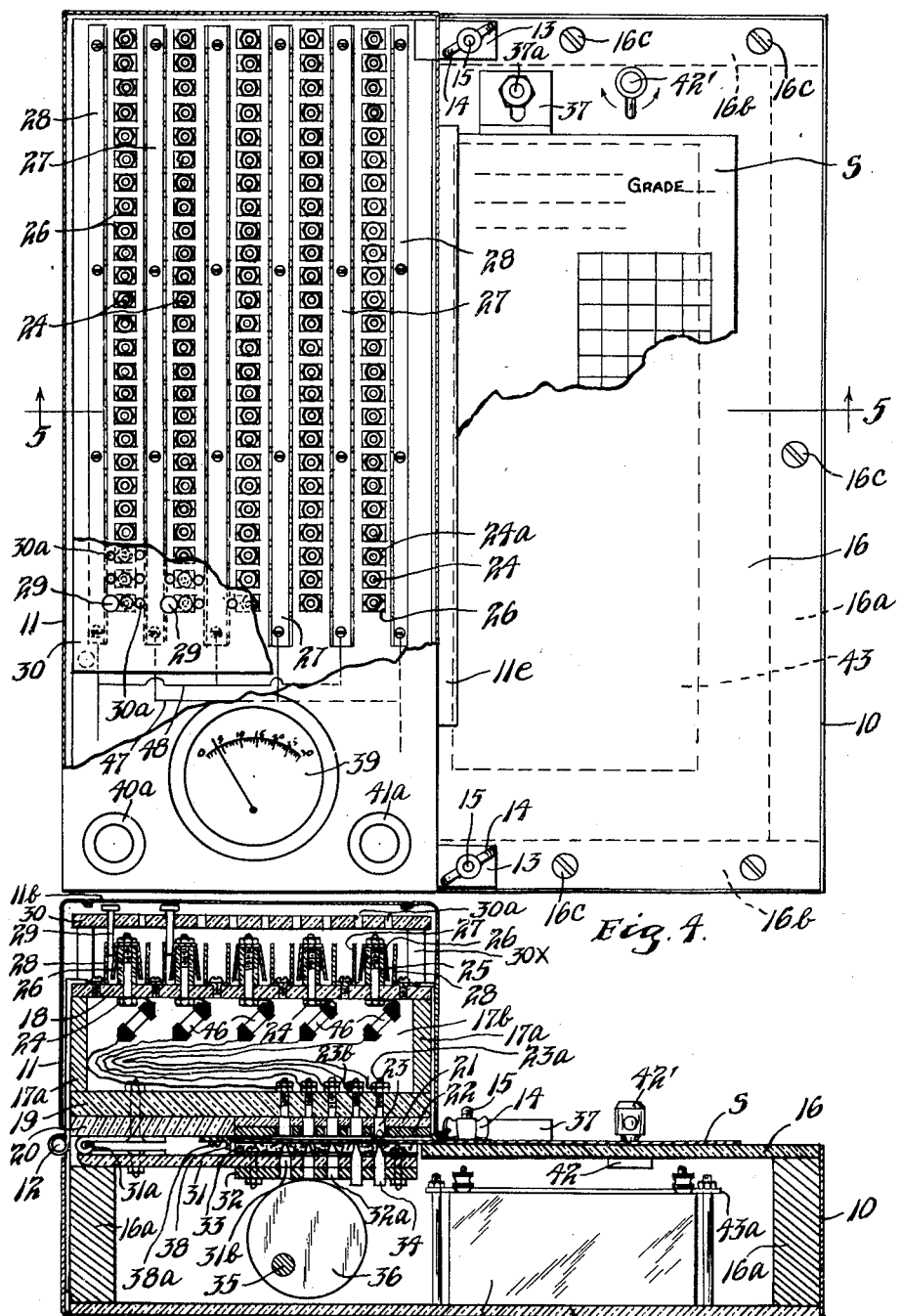

April 12, 1938.  R. B. JOHNSON  2,113,620
EXAMINATION PAPER GRADING DEVICE (ELECTRICAL)
Filed Oct. 9, 1933  6 Sheets-Sheet 6
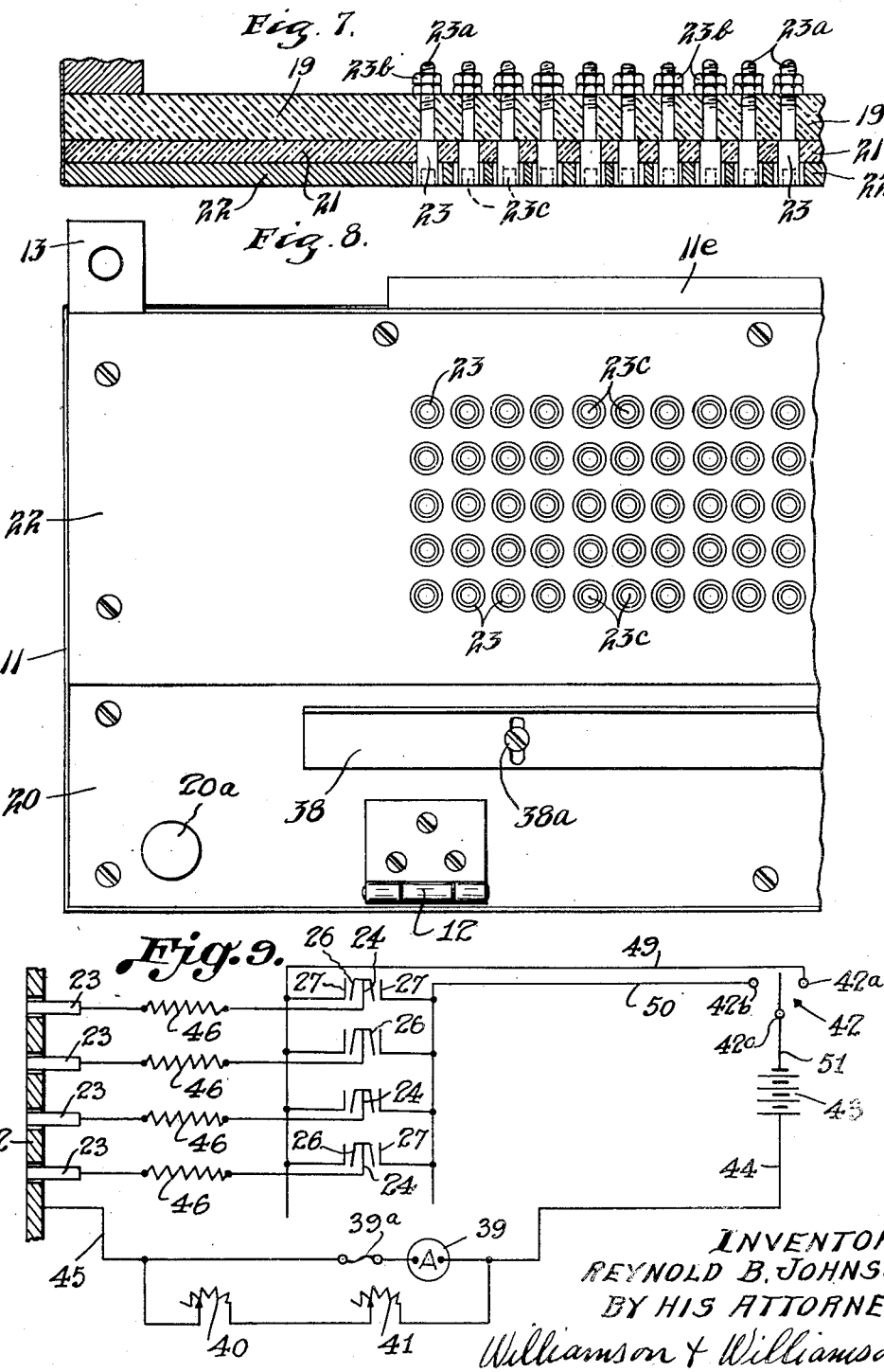

UNITED STATES PATENT OFFICE

2,113,620

EXAMINATION PAPER GRADING DEVICE (ELECTRICAL)

Reynold B. Johnson, Minneapolis, Minn., assignor to International Business Machines Corporation, New York, N. Y., a corporation of New York Application October 9, 1933, Serial No. 692,912

14 Claims. (Cl. 235—61.7)

My invention pertains to devices for grading examination papers and more particularly to devices for electrically determining the number of correct answers and the number of incorrect answers appearing on an examination paper.

At many schools and colleges in conducting examinations, question sheets are used whereon a series of numbered or lettered answers, only one of which is correct, are shown below each question. In a space provided for the purpose the student indicates the numeral or letter identifying the one of the several answers which he believes to be correct. Considerable work and time are expended in correcting a large number of examination papers and considerable chance of error in grading such papers exists. Also, the cost of paper stock and printing for such combined question and answer sheets is considerable.

It is an object of my invention to provide examination answer sheet grading apparatus whereby the relative locations of pencil marks on a sheet of paper may be determined electrically and whereby the number of such marks located in predetermined areas on such a sheet may be indicated by electrical indicating means.

Another object is to provide a method for grading an examination answer sheet of the type described by utilizing the electrical conductivity of pencil marks on said sheet to close circuits through pairs of electrical contacts engaging said sheet in predetermined areas thereon and to indicate by electrical indicating means connected with said contacts the number of pairs of contacts connected together by pencil marks in said predetermined areas.

Another object is to provide a grading device wherein an examination answer sheet, of suitable form and suitably marked by the student to indicate the answers he has selected, may be placed and wherein means is provided to immediately provide a direct indication on the scale of an electrical indicating instrument of the number of correct answers or of erroneous answers marked on said sheet.

Still another object is to provide such a grading device wherein respective indication of the correct and incorrect answers on an examination sheet may be automatically made on said sheet for subsequent reference by the instructor or student.

Yet another object is to provide such a grading device wherein control may be effected to cause an electrical indicating instrument to successively indicate the number or percentage of correct answers and the number or percentage of incorrect answers on a sheet placed in said device.

A still further object is to provide such a device which may be rapidly and accurately operated by a person who does not understand the subject to which the examination pertains.

These and other objects and advantages of the invention will be more fully set forth in the following description made in connection with the accompanying drawings, in which like reference characters refer to similar parts throughout the several views, and in which:—

Fig. 1 is a top view of my electrical examination scoring device showing an examination sheet in place therein;

Fig. 2 is a side view;

Fig. 3 is a front end view with the upper casing swung upwardly and the presser plate shown in full lines in upwardly swung position and in dotted lines in normal position;

Fig. 4 is a top view with certain portions broken away to show internal parts and showing a portion of an answer sheet inserted in the device;

Fig. 5 is a vertical transverse sectional view taken along the line 5—5 of Fig. 4 as indicated by the arrows;

Fig. 7 is a detail sectional view of the contact plate and adjacent parts;

Fig. 8 is a bottom view of a portion of the contact plate and associated parts, and Fig. 9 is a schematic electrical connection diagram of a portion of the electrical circuit of my device.

Figure 6:
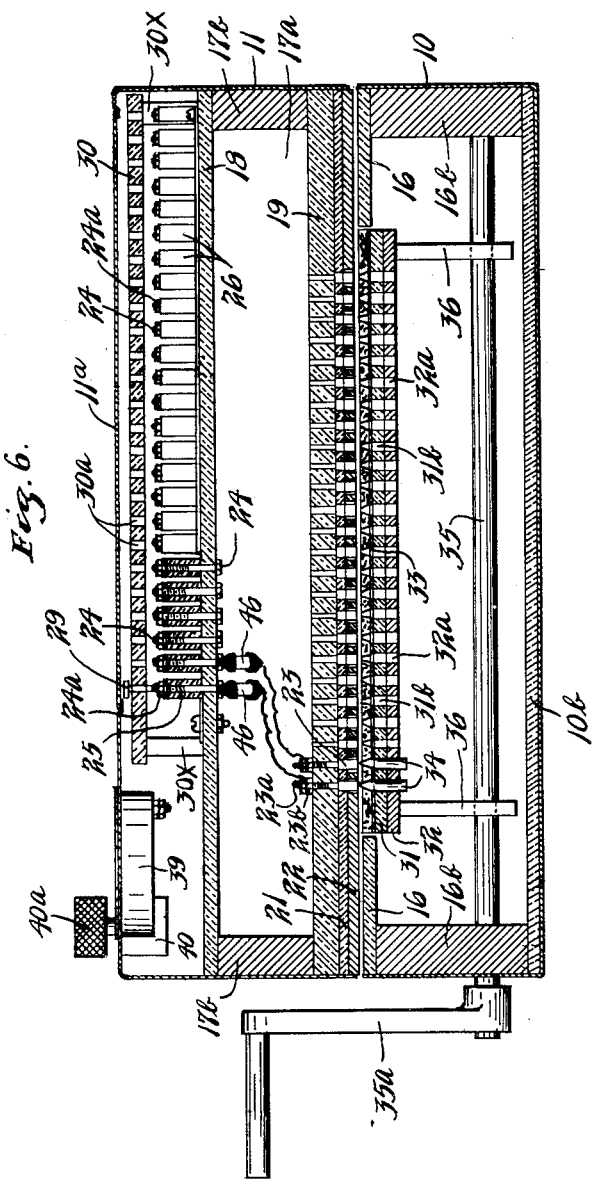
Fig. 6 is a vertical longitudinal sectional view taken along the line 6—6 of Fig. 1 as indicated by the arrows.

My invention consists of means whereby examinations may be conducted and graded and includes question sheets, answer sheets and an electrical grading device. The question sheets each have a series of numbered (or lettered) examination questions printed or otherwise shown thereon and a series of answers, only one thereof ordinarily being correct, associated with each question. The respective answers of each series are lettered (or numbered) for identification. The answer sheet has a series of lines or other marks printed or otherwise shown thereon defining a vertically aligned series of horizontally disposed rows of rectangular spaces, each row being identified as associated with a certain one of the questions appearing on the question sheet described above and each space of a row being identified corresponding to one of the several answers pertaining to said question and shown on the question sheet. In answering a question the student places a lead pencil mark (which, as is well known, is electrically conductive) in a space on the answer sheet corresponding inidentification to the identification of the selected one of the several answers appearing on the question sheet, the horizontal group in which this space is located of course having the same identification as the question being answered. Various forms of pencil marks may be used, but the preferred form is that of a cross-like mark comprising two diagonal lines intersecting at approximately the center of the space.

Answer sheets marked by the students as described above are placed successively in my electrical grading device which may be caused to immediately indicate the number of correctly answered questions and/or the number of incorrectly answered questions in each answer sheet.

In general my grading device consists of a plurality of pairs of electrical contacts against which the face of an answer sheet may be pressed, each pair being registerable with one of the respective spaces on the answer sheet. Each pair of contacts is arranged to connect a corresponding one of a plurality of high resistance resistors to a circuit comprising a battery and a sensitive electrical indicating instrument. Any pair of the contacts will be connected together by an electrically conductive mark such as a pencil mark located in the space on the answer sheet engaged by that pair. Switching means is provided for connecting each of the resistors to either one of a pair of conductors and for connecting the battery and instrument to either one of the same conductors. Each resistor associated with contacts engaging a space on the answer sheet corresponding to a correct answer is ordinarily connected to one of said conductors and the remaining resistors are connected to the other of said conductors.

Referring to the drawings, the parts of my device visible from the exterior include a shallow rectangular open topped lower casing 10 and a rectangular open bottomed upper casing 11, each constructed of sheet metal or other suitable material. The upper casing 11 is disposed immediately above the lower casing 10, is substantially equal in length thereto, and extends in width from a point substantially flush with one longitudinal side of the lower casing 10 to approximately the longitudinal center line thereof. The upper casing 11 is swingably connected to the lower casing 10 at adjacent portions of the flush sides of the two casings by hinges 12 or other suitable means. Suitably apertured lugs 13 extend outwardly from the unhinged side of the upper casing 11 for engagement by wing-nuts 14 mounted on screw threaded studs 15 which extend upwardly from the lower casing 10. Engagement of the lugs 13 by the wing nuts 14 holds the upper casing 11 in normal position relative to the lower casing 10 as shown best in Figs. 1, 2 and 5. The upper casing 11 has integrally formed therewith a lip 11e extending outwardly and upwardly from the lower edge of the side opposite the hinges 12.

The upper casing 11 is provided with a door 11a in its upper side as shown in Fig. 1. The door 11a is swingably connected to the casing 11 by hinges 11b and has at its free edge a lifting handle 11c. A lock 11d suitably mounted in the upper portion of the upper casing 11 serves to lock the door 11b in closed position.

A panel 16, formed of Bakelite or other suitable material, closes the upper side of the lower casing 10 and is disposed with its upper surface substantially flush with the upper edges of the vertical side portions of the lower casing 10. The panel 16 is supported in the above described position by means of blocks 16a and 16b to which it is attached by means of screws 16c and which, in turn, are secured to the lower casing 10. A lining 10b, formed of wood or other suitable material, is located at the bottom of the lower casing 10 and is retained at its edge portions between the blocks 16a and 16b and the bottom of the lower casing 10.

In the lower portion of the upper casing a box is formed of sides 17a and 17b, a top 18 and a bottom 19 as best shown in Figs. 5 and 6. The sides 17a and 17b may be made of wood or other suitable material and the top 18 and the bottom 19 are preferably made of Bakelite or other similar insulating material. A plate 20, formed of wood or other suitable material, is secured to the lower side of the bottom 19 of the box in that portion thereof extending from the edge thereof adjacent the hinges 12 to the medial portion thereof. A plate 21, formed of Bakelite or similar material is secured to the remaining portion of the lower side of the bottom 19 of the box, and a contact plate 22, formed of electrical conducting material such as brass or other metal and similar in dimensions to the Bakelite plate 21, is secured in a position immediately below plate 21. The thicknesses of the plates 20, 21 and 22 are respectively such that the bottom surfaces of plates 20 and 22 are flush with each other and substantially flush with the lower edges of the upper casing 11.

The bottom 19 of the box, the Bakelite plate 21 and the metal plate 22 are each provided with a series of rows of apertures, corresponding apertures in the bottom 19 and the plates 21 and 22 being in alignment. The apertures in plate 21 are of smaller diameter than those of plate 22 and the apertures in the bottom 19 are of still smaller diameter. A cylindrical contact element 23 having a diameter slightly less than that of the apertures in plate 21 and a length equal to the combined thickness of plates 21 and 22, and provided with an integral upwardly extending screw threaded stud 23a of reduced diameter, is retained in each of the apertures in plate 21 so that a portion thereof extends through the corresponding aperture in plate 22 in spaced relation to the defining surface thereof to a point flush with the lower surface of the plate 22. The stud 23a of the contact element 23 extends upwardly through the corresponding aperture in the bottom 19 of the box to a point somewhat above the bottom 19. Nuts 23b are placed on the upper portion of the studs to hold the contact elements in place and to provide means for connection of an electrical conductor. Each of the contacts 23 is provided with a cup-like recess 23c in the lower end thereof.

The top 18 of the box is provided with a series of rows of apertures similar in number and arrangement to the apertures in the bottom 19 of the box but being more widely spaced. A bolt 24 extends upwardly through each of the apertures in the top 18. A bushing 25 encircles the medial portion of each of the bolts 24 immediately above the top 18 and a nut 24a is mounted on the upper end of each bolt. The apertured medial portion of a generally U-shaped contact member 26, formed of a strip of spring brass or copper or other suitable resilient electrically conductive material, is mounted on each bolt 24 and clamped between the upper end of the bushing 25 and the nut 24a associated therewith. Each U-shaped contact member 26 is so disposed on the corresponding bolt 24 that slightly divergent leg portions thereof extend downwardly on opposite sides of the bushing 25 as shown in Figs. 4, 5 and 6.

Metal contact bars 27, of channel shaped cross section, are secured to the top 18 of the box to extend longitudinally of said box midway between adjacent longitudinal rows of bushings 25 and a contact bar 28 of angle section is secured to the top 18 a short distance outwardly of each of the outer rows of bushings 25 as shown in Figs. 4 and 5. Each of the contact bars 27 and 28 is disposed with the flange portions thereof extending upwardly and these flanged portions are cut at intervals along vertical lines to form series of contact fingers, of which each finger is adjacent and associated with one leg of one of the U-shaped contact members 26. Contact pins 29, each adapted to be wedged between a leg of one of the U-shaped contact members 26 and the contact finger associated therewith, cooperate with said legs and fingers to form a plurality of electrical switching units.

A panel 30, located above the top 18 and the parts supported thereby and formed of Bakelite or similar material, is supported by posts 30x which are secured thereto and to the top 18. The panel 30 is provided with a series of rows of apertures 30a, each aperture being adapted for extension therethrough of one of the contact pins 29 and being located directly above the space between one of the contact fingers and the corresponding one of the contact members 26. The panel 30 is so arranged that the apertured portion thereof lies immediately below the door 11a in the top of the upper casing 11.

The top panel 16 of the lower casing 10 is cut away or apertured in portions underlying the portion of the contact plate 22 in which the contact elements 23 are disposed and extending to a point below the hinged edge of the upper casing 11. A presser plate 31, formed of Bakelite or similar insulating material, is disposed in the apertured portion of the panel 16 and is swingably connected to the plate 20 by hinges 31a or other suitable means, as is best shown in Fig. 5. A stiffening member or backing plate 32, constructed of relatively rigid material such as steel or the like, is disposed below and secured to the portion of the presser plate 31 lying beneath the contact plate 22. A pad 33, formed of compressible material such as felt or the like, is disposed above and secured to the portions of the presser plate 31 lying beneath the contact plate 22. The presser plate 31 and the backing plate 32 therebelow are respectively provided with series of rows of apertures 31b and 32a arranged for registration with the cup-like recesses 23c in the lower ends of the contact elements 23. Marking or piercing pins 34, formed of insulating material such as hard fiber, hard rubber or Bakelite and provided for placement in the apertures 31b and 32a as shown in Figs. 5 and 6, have at their medial and lower portions such diameters as to permit the pins to be frictionally retained in the apertures 31b and 32a and are tapered to a point at their upper ends. The pins are inserted in the apertures 31b and 32a from below and their pointed upper ends pierce the compressible pad 33 and extend upwardly thereabove to a point at which they will extend into the recesses 23c of the contact elements 23 when the presser plate 31 is at the upper limit of its movement. The space between the contact plate 22 and the felt pad 33 comprises a shallow chamber in which an answer sheet S or portions thereof may be placed.

A shaft 35 is disposed within and longitudinally of the lower casing 10 a substantial distance below the backing plate 32 and is journaled in suitable apertures in the blocks 16b as best shown in Fig. 6. A crank 35a is mounted on a portion of the shaft 35 extending to the exterior of the front side of the lower casing 10. Cams 36 are mounted on shaft 35 below and in contact with the respective non-apertured end portions of the backing plate 32.

An adjustable guide or gauge 37, comprising a metal member substantially of angle section and having a slot in the horizontally disposed leg thereof is attached to the upper side of the rear portion of the panel 16 by means of a nutted bolt 37a. An adjustable guide strip 38 of angle section and having transverse slots in one leg thereof is secured to the lower side of the plate 20 adjacent and parallel to the adjacent edge of the contact plate 22 by means of screws 38a extending through said slots into plate 20.

An electrical indicating instrument 39 and two rheostats 40 and 41 respectively having operating knobs 40a and 41a are mounted in the upper portion of the upper casing 11 as indicated in Figs. 1, 2, 3, 4, 6, and 9.

A single pole, double throw three-position switch 42 having a central "off" position and being equipped with an operating knob 42' is mounted on the rear portion of the panel 16 as shown in Figs. 1, 2, 3, 4 and 5.

A battery 43 is disposed within the lower casing 10 and is secured by a clamp 43a to the bottom lining 10b of the lower casing 10.

Referring to Fig. 9, an electrical conductor 44 is connected between one terminal of the battery 43 and one terminal of the electrical indicating instrument 39. The remaining terminal of the instrument 39 is connected through an instrument protective fuse 39a and a conductor 45 to the metal contact plate 22. The rheostats 40 and 41, connected together in series, are connected in parallel with the series combination of the instrument 39 and the fuse 39a to form an adjustable shunt thereacross. Rheostat 40 is of relatively high resistance so as to serve as a main calibrating rheostat and rheostat 41 is of relatively low resistance so as to serve as a vernier calibrating rheostat.

The contact elements 23, associated with the contact plate 22, are each connected to the corresponding one of the bolts 24 through a resistor 46.

Alternate ones of the metal contact bars 27 and 28 are connected together by conductors 47 and 48 to form two interconnected groups of contact bars, each group constituting a bus. The two buses are respectively connected to the stationary contacts 42a and 42b of the switch 42 by means of conductors 49 and 50. The movable contact 42c of the switch 42 is connected through a conductor 51 to the remaining terminal of the battery 43.

Electrical conductors connecting together elements respectively located in the upper and lower casings 11 and 10 are arranged in the form of a flexible multiconductor cable which extends through a suitable aperture 20a in the plate 20.

The answer sheets with which my scoring device may be used must have lines or other marks printed or otherwise produced thereon defining a system of spaces wherein the centers of the respective spaces are arranged and spaced apart in accordance with the arrangement and spacing of the contact elements 23 of my device. Also, the respective distances between the top and left hand boundaries of said system and the top and left hand edges of the answer sheet must be such that contact of these edges with the guides 37 and 38 of my device will bring said system into registration with the contact elements 23. Sheets may be used having fewer rows of spaces or fewer spaces per row than the number of rows of contacts 23 and the number of contacts 23 per row provided in my device. Also sheets may be used wherein two series of rows of spaces are provided, the respective series being so located with respect to opposite corners of the sheet that after one series has been in position for registration with the contacts 23, a rotation of the sheet through 180 degrees will bring the remaining series into position for registration with the contacts 23. The sheet S shown in Figs. 1, 4 and 5 as partially broken away and with one series of spaces thereon in position for registration with the contacts 23 is of this type.

It will be noted that my device, in the embodiment thereof shown in the drawings, has contacts 23 for use with answer sheets having a maximum of twenty-five horizontal rows of five spaces each and hence can be used with examinations having up to twenty-five questions and up to five possible answers for each question.

Each horizontal row of spaces on the sheet S pertains to one question appearing on a question sheet (not shown) and several possible answers to the question, including both correct and incorrect answers, also appearing on the question sheet. The student makes a pencil mark in the space associated with the answer which he has selected and this mark preferably should be in the form of a cross, comprising diagonals which intersect at the center of the space.

*Operation*

In use of my device it is first set to correspond to the examination in connection with which it is to be used.

The contact bars 27 and 28 connected to the stationary contact 42b of the switch may be called the "correct" bus and the contact bars connected to the stationary contact 42a of the switch 42 may be called the "incorrect" bus. It will be noted that each of the contact members 26 may be connected to either the "correct" bus or the "incorrect" bus by inserting a pin 29 at one side or the other of the contact member 26. The first question in the examination is associated with the first transverse row of five spaces on the answer sheet and hence with a corresponding row of contacts 23 and a corresponding row of contact members 26. Pins 29 are inserted to connect the contact member 26 associated with the correct answer to the "correct" bus and the remaining ones of the contact members 26 in that row to the "incorrect" bus. If there is more than one correct answer given for one question, of course, contact members 26 associated with both or all of the correct answers would be connected to the "correct" bus by means of pins 29. Each of the remaining transverse rows of contact members are connected to the buses in accordance with which answers are correct as was described above.

Piercing pins 34 are placed in all of the apertures 31b corresponding to correct answers.

The answer sheets, which have been marked by students are placed in my device, one at a time between the contact plate 22 and the compressible pad 33 in the position shown in Figs. 1, 4 and 5 with their upper and left hand edges respectively in abutment with the guides 37 and 38 so as to align the spaces on the sheet with corresponding ones of the contacts 23.

The crank 35a is turned to cause the cams 36 to raise the presser plate 31 to a position whereat the sheet S will be pressed against the contact plate 22 and the contact elements 23. Pencil marks in various spaces, being of electrically conductive material, will then connect various corresponding contact elements 23 to the contact plate 22. The switch 42 is operated to connect its movable contact 42c to its stationary contact 42b which is connected to the "correct" bus. Current will then flow from one terminal of the battery 43, through the conductor 44, the instrument 39, the fuse 39a, the conductor 45 to the contact plate 22. From the contact plate 22 the current will divide and flow through certain ones of the circuits including the resistors 46 to the "correct" bus through the contact members 26, pins 29 and contact bars 27 and 28. From the correct bus the current will reach the remaining terminal of the battery through the switch 42 and the conductor 51. The only ones of the circuits referred to before as including resistors 46, through which current will flow are those which are connected to the "correct" bus by pins 29 and in which the contact element 23 thereof is simultaneously connected to the contact plate 22 through a pencil mark.

The pointer of the instrument 39 will of course deflect in proportion to the amount of current flowing through the instrument and this current will have a magnitude proportional to the number of resistors 24 which are carrying current from the contact plate 22 to the "correct" bus. The scale of the instrument is marked with numerals indicating the number of resistors which are carrying current and thereby will directly indicate the number of correct answers represented by pencil marks in the spaces on the answer sheet.

To obtain the number of incorrect answers the switch 42 is operated to connect the "incorrect" bus to the battery 43. The action of the circuit and the elements thereof will be similar to the above described action except that the current passing through the instrument will pass through pencil marks placed in spaces on the answer sheet corresponding to incorrect answers.

If a student has put pencil marks in more than one of the spaces associated with answers to one question in an attempt to cheat, the number of correct answers and the number of incorrect answers shown by the instrument will add up to a greater number than the total number of questions to be answered and hence the attention of the operator of my device will be directed to the irregularity.

The pins 34 will puncture the answer sheet in each of the spaces corresponding to a correct answer and hence correctly and incorrectly answered questions may each be subsequently identified on the answer sheet. In each case where a question has been correctly answered the puncture produced by a pin 34 will appear in the same space as the pencil mark made by the student and in each case of an incorrect answer the puncture will appear in a different space than the pencil mark. This feature is of value to the instructor in determining which of the questions gave the students the greatest amount of difficulty and is of value to the students, after their answer sheets have been returned to them, in determining which questions they had answered incorrectly.

It has been found desirable that the instrument 39 be a direct current milliammeter giving a full scale deflection on a current of one milliampere (one one-thousandth of one ampere) and that each of the resistors 46 be of very high resistance such as two megohms (two million ohms). A forty-five volt battery, such as a radio B-battery, has been found to operate satisfactorily with a circuit having an instrument and resistors such as described above. The main calibrating rheostat 40 and the vernier calibrating rheostat 41 are for the purpose of compensating for variation in the voltage of the battery 43 by shunting a small part of the total current around the instrument 39 and hence so adjusting the circuit that the instrument pointer will deflect to a numeral on the instrument scale corresponding to the number of resistors 46 which are carrying current. My device may be calibrated before grading a set of answer sheets by filling out spaces on an answer sheet with pencil marks indicating the correct answers, placing this sheet in the machine, operating the crank 35a, placing the switch 42 in position for determining the number of correct answers and then adjusting the rheostats 40 and 41 to bring the pointer of the instrument to a numeral on the instrument scale corresponding to the total number of questions to be answered. The resistors 46 have a very high resistance relative to the resistance of the short portions of the pencil marks encountered by the contacts of my device and hence non-uniformity in the respective resistances of various pencil marks will not introduce an appreciable error in the indication afforded by the instrument 39 of the device. Also, when cross-shaped marks formed of diagonal lines intersecting at the centers of the spaces on the answer sheet are used, the circuit produced between the contact elements 23 and the contact plate 22 by the pencil mark will consist of four very short portions of the pencil marks connected in multiple and hence will be of relatively low resistance.

It is to be understood that my invention is not limited to use in grading examination answer sheets but is capable of equally efficient use in evaluating or summarizing data of any suitable kind which can be represented by electrically conductive marks placed in various spaces on a sheet of paper. Accordingly my invention is readily adaptable for use in various data tabulating operations.

It is apparent that I have invented a device capable of being rapidly and easily operated to accurately indicate the numbers of correct and incorrect answers on large numbers of examination answer sheets, which may be satisfactorily operated by persons who are not required to understand the subject to which the questions and answers pertain, and which marks said answer sheets to respectively identify the correct and incorrect answers.

It will, of course, be understood that various changes may be made in the form, details and arrangement and proportions of the parts without departing from the scope of my invention, which generally stated, consists in a device capable of carrying out the objects above set forth, and in the novel parts and combinations of parts disclosed and pointed out in the appended claims.

What is claimed is:—

1. In a machine for detecting electrically conductive marks on a sheet, a frame having a chamber of predetermined size for receiving said sheet, said chamber being arranged to receive said sheet in a predetermined position relative to said frame, a plurality of pairs of electrical contacts carried by said frame and having ends terminating in a common plane and located for abutment with the face of a sheet disposed in said chamber, each pair of said contacts being registerable with a different portion of said sheet, means for pressing said sheet against said contacts, two contact circuits, means for connecting each pair of contacts to either of said contact circuits, an electrical indicating circuit including electrical indicating means, and a source of electrical energy, and means for connecting said indicating circuit to either of said contact circuits whereby a conductive mark on said sheet interconnecting a pair of contacts will close the one of said contact circuits to which said pair is connected and, if said indicating circuit is connected through said last mentioned means to said one of the contact circuits, will close said indicating circuit and thus operate said indicating means.

2. For cooperation with a sheet having a plurality of defined spaces each adapted for receiving an electrically conductive mark, an electrically conductive plate against which said sheet may be placed, said plate having apertures therethrough located for registration respectively with the spaces on said sheet, a contact element located in each of said apertures with the end thereof toward said sheet substantially flush with the surface of said plate, said elements each being electrically insulated from said plate, whereby conductive marks in said spaces will form electrical connections between corresponding ones of said elements and said plate, electrical indicating means connected to said plate, a pair of electrical conductors, means for selectively connecting various ones of said elements to the first one of said conductors, means for selectively connecting various ones of said elements to the second one of said conductors, and means for connecting said indicating means to either of said conductors whereby said electrical indicating means may be connected to either of said conductors to indicate the number of said elements out of the ones connected to said conductor which are connected to said plate through conductive marks.

3. For cooperation with a sheet having means defining a series of spaces thereon, said sheet being adapted to receive an electrically conductive mark thereon in each or any of said spaces, a pair of plates between which said sheet may be placed, means for urging said plates toward each other, one of said plates facing the mark receiving side of said sheet having apertures therein aligned with respective ones of said spaces, electrical contact elements mounted in said apertures for abutment with said sheet, an electrical circuit including electrical current measuring means and a source of electrical energy, selected ones of said contact elements being so connected to said circuit that a conductive mark engaging any contact element will cause current to flow therethrough and through said measuring means and piercing members removably mountable in said second plate in locations registerable with selected ones of said defined spaces and extending from said second plate toward said first plate a short distance whereby said piercing members will respectively puncture portions of said sheet within the defined spaces on said sheet as said contact elements are brought into abutment with said sheet.

4. For cooperation with a sheet having means defining a series of spaces thereon, said sheet being adapted to receive an electrically conductive mark thereon in each or any of said spaces, a pair of plates between which said sheet may be placed, means for urging said plates toward each other, the one of said plates facing the mark receiving side of said sheet being electrically conductive and having apertures therethrough located for registration respectively with the spaces on said sheet, a contact element located in each of said apertures with the end thereof toward said sheet substantially flush with the surface of said plate, said elements each being electrically insulated from said plate whereby conductive marks in said spaces will form electrical connections between corresponding ones of said element and said plate, electrical indicating means connected to said plate and selected ones of said elements to indicate the presence of electrical connections formed by said conductive marks, and piercing members removably mountable in said second plate in locations registerable with said elements and projecting from said second plate toward said first plate a short distance, said elements being recessed to receive the projecting portions of corresponding ones of said piercing members whereby operation of said urging means will simultaneously cause operation of said contact elements and said indicating means to indicate the presence of conductive marks and operation of said piercing members to pierce said sheet in certain spaces thereon.

5. A device for operating on a sheet having conductive markings thereon, the sheet having a plurality of groups of spaced apart areas, each area adapted for receiving one marking, the areas of a group having different positions within the group comprising a plurality of groups of pairs of electric contacts corresponding to the groups of areas and adapted to be pressed upon the paper to engage said markings for closing a circuit across said contacts, indicating means, and means for at will successively connecting one group of said pairs of contacts and then another of the groups to said indicating means to operate the same successively according to the plurality of markings found by each group of the pairs of contacts and irrespective of the positions of the marked areas within its group of areas.

6. A device for operating on a sheet having a plurality of columns of areas, each area adapted to be marked indistinguishably from the other areas, comprising a plurality of corresponding columns of electric contacts for simultaneously sensing all of said areas for markings, indicating means, and means for selectively connecting a plurality of said sensing means to said indicating means to operate the latter according to a plurality of markings sensed in certain areas of a plurality of said columns, and means for rendering the markings in the other areas of the same columns ineffective to act through the sensing means upon the indicating means.

7. A device for operating on a sheet including two sets of areas for receiving markings comprising a plurality of parallel rows of sensing elements for simultaneously sensing all of said areas, indicating means, means for selectively connecting the sensing means associated with a plurality of areas of one of said sets in one circuit, means for connecting the sensing means associated with a plurality of the areas in the other of said sets in a separate circuit, and a single switch for selectively connecting either of said circuits to said indicating means to operate the latter according to the plurality of marked areas in the set of areas associated with the selected circuit.

8. A device for evaluating examination answer papers having areas provided for correct answer markings and areas provided for incorrect answer markings, said areas being arranged in parallel columns, each column having a plurality of spaced apart areas comprising means for electrically sensing the markings in said areas, indicating means controlled by said sensing means, and means operable during the evaluating operation for distinctively marking with individual, like, marks indistinguishable from each other, each separate one of the areas representing one set of answers.

9. In a machine for operating on a sheet having columns of spaces, each space adapted to be marked indistinguishably from the other spaces; comprising, in combination, means for simultaneously searching all said spaces in the different columns for markings, a single indicating device, and control connections between said searching means and the indicating device for operating the latter to furnish a single indication corresponding to the total count of marked spaces found by the searching means in a plurality of said columns.

10. In a machine for operating on a sheet having a plurality of columns of spaces, each space adapted to be marked indistinguishably from the other spaces; comprising, in combination, means for searching said columns of spaces simultaneously for markings, an indicating device, control connections between the searching means and the indicating device to operate the latter to furnish a single indication corresponding to the total number of marked spaces found by the searching means in certain locations of said plurality of columns, and means for selectively rendering the searching means ineffective to control the indicating device according to the number of marked spaces in the other locations of the same columns.

11. In a machine for operating on a sheet having a plurality of columns of areas, each of which may be marked indistinguishably from the other areas; the combination of sensing means for searching all the columns of areas simultaneously for markings, an indicating device, control connections between the sensing means and the indicating device, and means for selectively setting said connections to cause the sensing means to operate the indicating device to furnish a single indication corresponding to the total number of markings found by the sensing means in selected areas of a plurality of said columns and to eliminate the sensing of marks in other areas of said columns from effect on the indicating device.

12. In a machine for operating on a sheet having a plurality of sets of spaces, each space adapted to be marked; comprising in combination, means for simultaneously searching both sets of spaces for markings, a single indicating device for indicating a value corresponding to the number of marked spaces in one or another of said sets of spaces, control connections between the searching means of each set of spaces and the indicating device, and a selector adjustable to render the connections effective, at one time, to operate the indicating device for indicating a value corresponding to the total number of marked spaces in one set and at another time to indicate a value corresponding to the total number of marked spaces in another of said sets of spaces.

13. A device for evaluating marks on a sheet having a plurality of sets of mark-receiving areas, each set having its areas distributed along the length and width of the sheet; comprising electrical sensing devices arranged similarly to said areas, one such device for each area, for electrically sensing all of said areas simultaneously for marks, indicating means, and means operable for successively connecting the sensing devices of one of said sets of areas and the devices of another of said sets of areas, over separate circuits, with said indicating means to actuate the latter successively, each time according to the aggregate of marks sensed by the connected devices in the associated set of areas.

14. A device for evaluating marks on a sheet having a plurality of sets of mark-receiving areas, each set having its areas distributed along the length and width of the sheet and some of which may be interspersed with areas of another set; comprising electrical sensing devices arranged similarly to said areas, one such device for each area, for electrically sensing all of said areas simultaneously for marks, indicating means, separate circuits for actuating the indicating means, and means operable for successively connecting the devices associated with one set of areas and those associated with the set of interspersed areas, through said separate circuits, to the indicating means to actuate the same successively, each time according to a plurality of marked areas sensed by the connected devices in the associated set of areas.

REYNOLD B. JOHNSON.